United States Patent [19]
Katseff et al.

[11] Patent Number: 5,822,537
[45] Date of Patent: *Oct. 13, 1998

[54] MULTIMEDIA NETWORKED SYSTEM DETECTING CONGESTION BY MONITORING BUFFERS' THRESHOLD AND COMPENSATING BY REDUCING VIDEO TRANSMITTAL RATE THEN REDUCING AUDIO PLAYBACK RATE

[75] Inventors: Howard P. Katseff, Manalapan; Bethany Scott Robinson, Colts Neck, both of N.J.

[73] Assignee: AT&T Corp., Middletown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 628,391

[22] Filed: Apr. 5, 1996

Related U.S. Application Data

[62] Division of Ser. No. 201,863, Feb. 24, 1994, abandoned.

[51] Int. Cl.$^6$ ..................................................... G06F 15/16
[52] U.S. Cl. ................................ 395/200.61; 395/200.63; 395/200.65; 345/302; 370/231
[58] Field of Search .......................... 395/200.13, 220.19, 395/250, 877, 878, 880, 806, 807, 200.61, 200.62, 200.63, 200.34, 200.36; 370/229, 231, 235, 302; 348/439, 419; 345/302

[56] References Cited

U.S. PATENT DOCUMENTS

| | | | |
|---|---|---|---|
| 5,109,482 | 4/1992 | Bohrman | 395/328 |
| 5,159,447 | 10/1992 | Haskell et al. | 348/419 |
| 5,191,645 | 3/1993 | Carlucci et al. | 395/328 |
| 5,193,148 | 3/1993 | Alcorn et al. | 395/343 |
| 5,237,648 | 8/1993 | Mills et al. | 395/133 |
| 5,287,182 | 2/1994 | Haskell et al. | 348/500 |
| 5,544,170 | 8/1996 | Kasahara | 370/253 |
| 5,623,490 | 4/1997 | Richter et al. | 370/263 |

FOREIGN PATENT DOCUMENTS

| | | |
|---|---|---|
| 0271866A2 | 6/1988 | European Pat. Off. . |
| 0460867A2 | 12/1991 | European Pat. Off. . |
| 0548597A1 | 6/1993 | European Pat. Off. . |

OTHER PUBLICATIONS

Rangan et al. "Designing an ON–Demand Multimedia Service" IEEE Communication Magazine, v30 iss7, Jul. 1992.

Megiddo et al. "The Minimum Reservation Rate Problem in Digital Audio/Video", Israel Symposium on Theory of Computing, 1993.

Revindran et al. "Delay Compensation Protocols for Synchronization of Multimedia Data Streams", IEEE Trans. on Knowledge and Data Engineering, v5 iss4, Aug. 1993.

Computer Communications, vol. 15, No. 10, Dec. 1, 1992 pp. 611–618, Blakowski G. et al, "Tool Support for the Synchronization and Presentation of Distributed Multimedia".

(List continued on next page.)

*Primary Examiner*—Dinh C. Dung
*Attorney, Agent, or Firm*—Thomas A. Restaino

[57] ABSTRACT

Disclosed is a networked multimedia information system which may be utilized to record, store and distribute multimedia presentations together with any supplemental materials that may be referenced during the presentation. The recorded presentation, together with the associated supplemental materials, may be simultaneously presented on a display containing two separate viewing windows. The effects of network congestion are minimized by prefetching audio and video data for storage in audio and video buffers. An adaptive control algorithm compensates for network congestion by dynamically varying the rate at which video frames are retrieved over the network, in response to network traffic conditions. The audio playback speed is reduced if the audio data does not arrive fast enough over the network to maintain the desired size of the audio buffer after the amount of video data transmitted across the network has been reduced to a minimum value.

12 Claims, 6 Drawing Sheets

OTHER PUBLICATIONS

IEEE Communiations Magazine, vol. 29, No. 10, Oct. 1, 1991, pp. 54–64, Israel Cidon et al, "Bandwidth Management and Congestion Control on plaNET".

Cherry, Lorinda L. and Waldstein, Robert K., "Electronic Access To Full Document Text And Images Through Linus," AT&T Technical Journal, Jul./Aug. 1989, pp. 72–90.

Davcev, Danco, Cakmakov, Dusan and Cabukovski, Vanco, "Distributed Multimedia Information Retrieval System," Computer Communications, vol. 15, No. 3, Apr. 1992, pp. 177–184.

Haskin, Roger L., "The Shark Continuous–Media File Server," Digest of Papers, COMPCON Spring '93, San Francisco, California, Feb. 22–26, 1993, pp. 12–15.

Katseff, Howard P. and London, Thomas B., "The Ferret Document Browser," USENIX Summer 1993 Technical Conference, Cincinnati, Jun. 1993.

Lesk , Michael, "Television Libraries for Workstations: An All–Digital Storage, Transmission and Display for Low–rate Video," (apparently unpublished).

O'Gorman, Lawrence, "Image and Document Processing Techniques for the RightPages Electronic Library System," Proceedings of the 11th IAPR International Conference on Pattern Recognition, The Hague, Netherlands, Aug. 30—Sep. 3, 1992, 1992, vol. II, Conference B: Pattern Recognition Methodology and Systems, IEEE Computer Society Press, California, pp. 260–263.

Poole, Lon, "Quicktime In Motion: Pasting Movies Into Documents Will Be As Easy As Pasting Graphics," Macworld, Sep. 1991, pp. 154–159.

Rangan, P. Venkat, Vin, Harrick M., and Ramanathan, Srinivas, "Designing An On–Demand Multimedia Service," IEEE Communications Magazine, vol. 30, No. 7, Jul. 1992, pp. 56–64.

Rowe, Lawrence A. and Smith, Brian C., "A Continuous Media Player," Proceedings of the 3rd International Workship on Network and OS Support for Digital Audio and Video, San Diego, CA, Nov. 1992.

Rowe, Lawrence A. and Larson, Ray R., "A Video–on–Demand System," (apparently unpublished).

Semilof, Margie, "NetWare to Get Multimedia Hooks," Communications Week, No. 469, Aug. 30, 1993, pp. 21–22.

Story, Guy A., O'Gorman, Lawrence, Fox, David, Schaper, Louise Levy, and Jagadish, H.V., "The RightPages Image–Based Electronic Library for Altering and Browsing," Computer, Sep. 1992, pp. 17–26.

Tobagi, Fouad A. and Pang, Joseph, "StarWorks—A Video Applications Server," Digest of Papers, COMPCON Spring '93, San Francisco, California, Feb. 22–26, 1993, IEEE Computer Society Press, pp. 4–11.

"Interview: Expert Discusses Multimedia Implementations on Networks," Communications Week, No. 471, Sep. 13, 1993 pp. 22–23.

| OBJECT PROFILE | |
|---|---|
| TITLE: | ELECTRONIC ACCESS TO MULTIMEDIA OBJECTS |
| AUTHOR/SPEAKER: | DOE, JOHN |
| ABSTRACT: | THIS PAPER DESCRIBES THE DESIGN AND IMPLEMENTATION OF A STORAGE AND BROWSING SYSTEM FOR MULTIMEDIA OBJECTS. IT ADDRESSES THE PROBLEMS OF ELECTRONIC CAPTURE, STORAGE AND DISPLAY. |
| DATE: | 12/12/92 |
| KEYWORDS: | MULTIMEDIA, STORAGE AND BROWSING SYSTEM, ELECTRONIC CAPTURE |

MEMORY POINTER: FILE SERVER 35, DATABASE 80

| STILL IMAGE HYPERLINK FILE ||
|---|---|
| FRAME NUMBER | STILL IMAGE PAGE NUMBER |
| 1 | 1 |
| 68 | 2 |
| 84 | 3 |
| 115 | 4 |
| 138 | 5 |
| 156 | 6 |
| ⋮ | ⋮ |
| N | M |

MULTIMEDIA NETWORKED SYSTEM DETECTING CONGESTION BY MONITORING BUFFERS' THRESHOLD AND COMPENSATING BY REDUCING VIDEO TRANSMITTAL RATE THEN REDUCING AUDIO PLAYBACK RATE

This is a divisional of application Ser. No. 08/201,863 filed on Feb. 24, 1994 now abandoned.

FIELD OF THE INVENTION

The present invention relates to a networked multimedia information system, and more particularly, to a system for the storage and distribution of a recorded multimedia presentation, such as a seminar or conference, together with any supplemental materials, such as viewgraphs, slides or handouts, that are referenced during the presentation.

BACKGROUND OF THE INVENTION

Businesses today require access to ever-increasing amounts of information, such as reports, correspondence, contracts, engineering drawings and marketing materials. Making this information available to a large number of distributed corporate employees is often a difficult problem.

There are a number of commercially available document management systems, such as NCR's Document Management System and Bellcore's SuperBook Document Browser, which allow still images of documents, photographs and diagrams to be electronically stored for subsequent access over a network.

For example, NCR's Document Management System controls the flow of image documents over a corporate network. A user employing a microcomputer or workstation can access documents that have been stored in an electronic format on a central file server using imaging technology.

However, there are few commercially available document management systems that also allow continuous media, such as recordings of audio and video presentations, to be stored and distributed over a network. Although multimedia applications make enormous demands on the resources of a computer system, recent advances in storage, processing, compression and network technologies have facilitated the development of networked multimedia information systems. These technologies have advanced to where it is now possible to combine numerous media, including documents, audio and video, into a single system.

Since the number of employees who may participate in a corporate presentation, such as a conference or a seminar, is often limited by scheduling and location constraints, it is desirable to provide a system that can record and store corporate presentations for subsequent viewing by additional corporate employees at convenient times and locations.

A major difficulty with subsequent viewing of recorded presentations, however, is the poor reproduction of supplemental materials associated with the recorded presentation, such as viewgraphs, slides and handouts. Accordingly, a need exists for an improved networked multimedia system capable of storing and indexing multimedia presentations, such as seminars and conferences, for subsequent access over a communications network. A further need exists for a networked multimedia system that separately processes the supplemental materials, such as viewgraphs, slides and handouts, associated with a recorded presentation in order to improve the clarity of the reproduced supplemental materials. In addition, a need exists for a networked multimedia system that is capable of synchronizing the audio and video components of a recorded presentation with the display of any supplemental materials referenced during the presentation.

SUMMARY OF THE INVENTION

Generally, according to one aspect of the invention, a networked multimedia information system is utilized to store and distribute multimedia objects, such as recorded presentations, over a network to a plurality of workstations. The networked multimedia information system includes an information retrieval system, a still image storage and retrieval system and a continuous media storage and retrieval system.

According to one aspect of the invention, the networked multimedia system is utilized to record, store and distribute multimedia presentations, such as seminars, meetings or conferences, and any supplemental materials that may be referenced during the presentation, such as viewgraphs, slides, blackboard annotations or handouts.

According to another aspect of the invention, the recorded presentation, and the associated supplemental materials may be simultaneously presented on a display containing two separate viewing windows. Preferably, the presentation of the audio and video components of the recorded presentation is synchronized with the presentation of the supplemental materials. In one embodiment, the synchronization of the recorded presentation and the associated supplemental materials is accomplished by means of hyperlink files, which identify the supplemental materials and the corresponding frame number in which the supplemental materials are referenced.

According to a further feature of the invention, a user can manipulate the supplemental materials displayed in one viewing window to control the video playback in the second viewing window, thereby allowing the supplemental materials to serve as an index to the recorded presentation. Once the user has selected the desired page or portion of the supplemental materials, the recorded presentation can be restarted from the video frame where the selected page or portion of the supplemental materials is referenced in the recorded presentation.

Another feature of the invention minimizes the effects of network congestion by prefetching audio and video data for storage in audio and video buffers. In one embodiment, the networked multimedia system compensates for network congestion by using an adaptive control algorithm, which dynamically varies the rate at which video frames are retrieved from the respective file server over the network, in response to network traffic conditions. In order to maximize the playback quality of the recorded presentation, the audio component of the recorded presentation is given preference over the video component.

Thus, when network congestion conditions are extreme, the network multimedia system will transmit only audio data, without any video data, to the respective workstation. If the audio data does not arrive fast enough over the network to maintain the desired size of the audio buffer when there is no video data being transmitted, the network multimedia system will reduce the speed at which the audio data is played by the workstation until the amount of audio data in the audio buffer has returned to the desired size.

A more complete understanding of the present invention may be had by reference to the following Detailed Description with the accompanying drawings.

DETAILED DESCRIPTION

Figure 1:
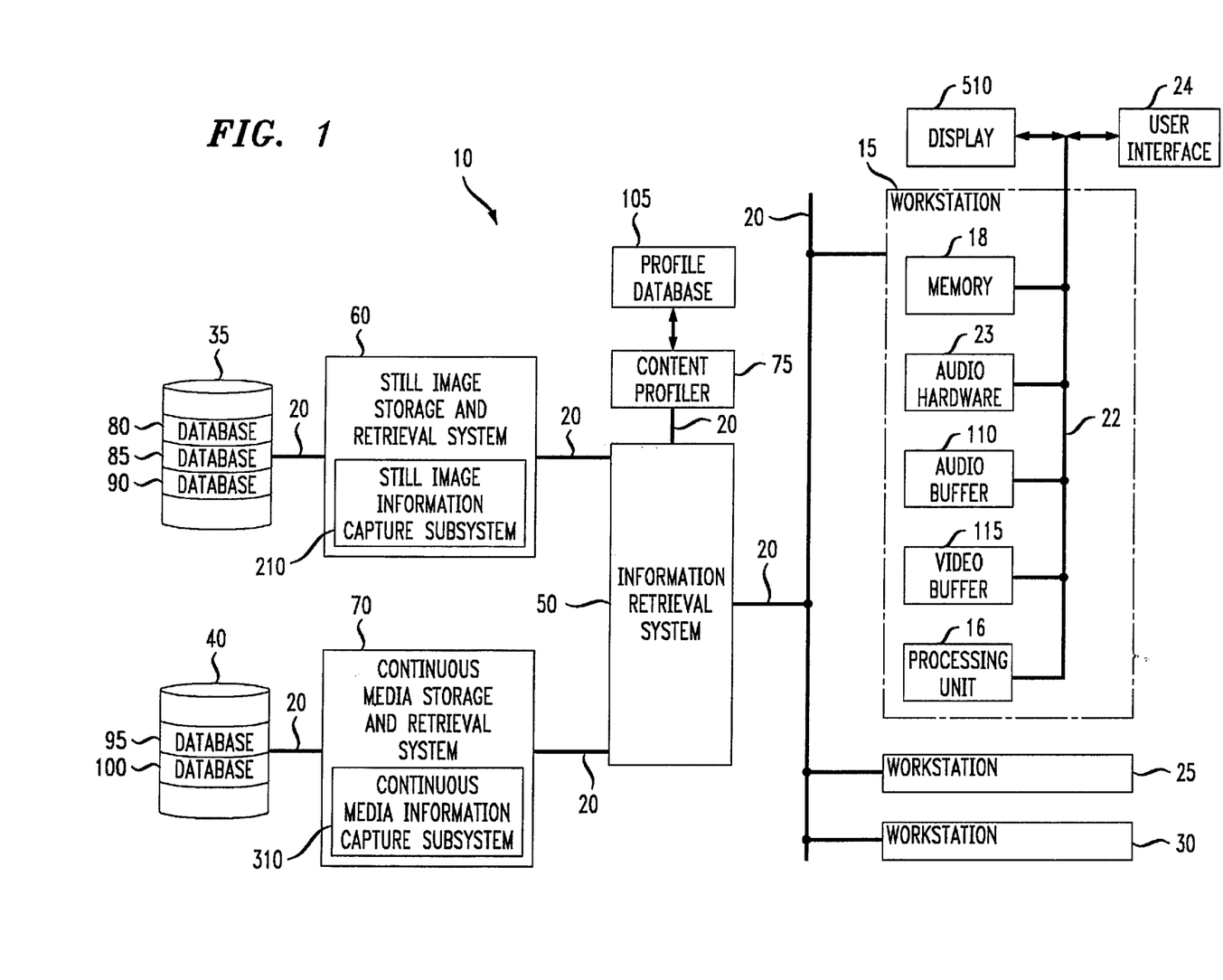
FIG. 1 is a schematic block diagram illustrating a networked multimedia information system according to the present invention.

The networked multimedia system 10 according to the present invention is illustrated in FIG. 1. The multimedia system 10 stores and indexes multimedia objects, such as documents, diagrams, photographs, audio, video and animation, for access by a user over a network 20.

A user employs a workstation, such as workstation 15, which may be a Sun SPARC workstation, model 10SX, 10M or classic M, produced by Sun Microsystems, Inc., of Mountain View, Calif., or a similar workstation offering high-resolution imaging and support for real-time audio. Each workstation, such as the workstation 15, may be comprised of a display 510, a processing unit 16, a memory unit 18, buses 22, audio hardware 23, an audio buffer 110, a video buffer 115 and a user interface 24, such as a mouse and/or a keyboard. A preferred embodiment of the display 510 is discussed below relative to FIG. 5.

The network 20 may be a local area network (LAN) or a wide area network (WAN), such as a nationwide corporate internet consisting of Ethernet networks interconnected by leased data circuits. Alternatively, the network 20 may be embodied as, e.g., an asynchronous transfer mode (ATM) network or an Integrated Services Digital Network (ISDN). As discussed further below, to accommodate the low bandwidth which is typical of these networks, data files are preferably compressed prior to transmission over the network 20.

As illustrated in FIG. 1 and discussed further below, the networked multimedia system 10 utilizes an information retrieval system 50 to coordinate the accessing of multimedia objects stored by a plurality of file servers, such as file servers 35, 40. The information retrieval system 50 will interact with a still image storage and retrieval system 60 to retrieve the still image objects stored by an associated file server 35. In addition, the information retrieval system 50 will interact with a continuous media storage and retrieval system 70 to retrieve the continuous media objects stored by an associated file server 40.

The information retrieval system 50 is preferably embodied as the Linus Database System, developed by AT&T, which is a "front end" system that allows a workstation to access information over a network that is stored in a number of distributed databases. For a description of the Linus Database System, see Lorinda L. Cherry and Robert K. Waldstein, "Electronic Access to Full Document Text and Images through Linus," AT&T Technical Journal, Vol. 68, No. 4, pp. 72–90 (July/August 1989), incorporated herein by reference.

An information retrieval system 50, such as the Linus Database System, typically provides the ability to store, index, search, and retrieve information from a plurality of databases. In addition, such information retrieval systems 50 typically provide an authentication mechanism that ensures that stored information is viewed only by authorized users.

The still image storage and retrieval system 60 is preferably embodied as the Ferret Document Browsing System, developed by AT&T, which together with file server 35, provides storage and retrieval functions for a collection of databases, such as databases 80, 85, 90, containing still images, such as images of documents, drawings and photographs. For a description of the Ferret Document Browsing System, see Howard P. Katseff and Thomas B. London, "The Ferret Document Browser," Proc. USENIX Summer 1993 Technical Conference, Cincinnati, OH. (June 1993), incorporated herein by reference.

Alternatively, the information retrieval system 50 and the still image storage and retrieval system 60 may be embodied as a single integrated system, such as the Document Management System, commercially available from NCR Corp., or the RightPages Image-Based Electronic Library System, developed by AT&T Bell Laboratories. For a description of the RightPages Image-Based Electronic Library System, see Guy A. Story et al., "The RightPages Image-Based Electronic Library for Alerting and Browsing," Computer, 17–26 (September 1992); Lawrence O'Gorman, "Image and Document Processing Techniques for the RightPages Electronic Library System," Proc. 11th International Conference on Pattern Recognition, The Netherlands, 260–63 (August 30–September 3, 1992), each incorporated herein by reference.

The still image storage and retrieval system 60 preferably includes a still image information capture subsystem 210, discussed further below relative to FIG. 2, which is utilized to obtain an electronic representation of each still image object and to store the electronic representation on a file server, such as file server 35.

The still image objects are preferably stored by a still image file server, such as file server 35, on a plurality of disk arrays or other secondary storage devices. The still image file server 35 may be embodied as a Sun SPARC workstation, commercially available from Sun Microsystems, Inc., of Mountain View, Calif. Alternatively, the still image objects may be stored on other mass storage devices that allow stored data to be accessed and shared by a plurality of workstations 15, 25, 30 over a network 20. In a preferred embodiment, file server 35 can be embodied as a plurality of distributed file servers which may be positioned at a plurality of remote locations throughout network 20.

The continuous media storage and retrieval system 70, together with file server 40, provides storage and retrieval functions for a collection of databases, such as databases 95, 100, containing continuous media, such as video, audio and animated graphics. For a discussion of an illustrative continuous media storage and retrieval system 70, see Lawrence A. Rowe and Brian C. Smith, "A Continuous Media Player," Proc. 3d Int'l Workshop on Network and Operating System Support for Digital Audio and Video, San Diego, Calif. (Novenber 1992), incorporated herein by reference. The Continuous Media Player system is available from the University of California, Berkeley.

The continuous media storage and retrieval system 70, such as the Continuous Media Player system referenced above, preferably provides the mechanism for digitizing and compressing audio, video and other continuous media for storage by a number of distributed file servers, in a manner described further below. In addition, the continuous media storage and retrieval system 70 provides the mechanism for accessing stored continuous media data files over network 20 for presentation on a workstation, such as workstation 15.

Alternatively, the continuous media storage and retrieval system 70 may be embodied as the multimedia network system commercially available from Fluent, Inc., now called Novell Multimedia.

The continuous media storage and retrieval system 70 preferably includes a continuous media information capture subsystem 310, discussed further below relative to FIG. 3, which is utilized to obtain an electronic representation of each continuous media object and to store the electronic representation on a file server, such as file server 40.

The continuous media objects are preferably stored by a continuous media file server, such as file server 40, on a plurality of disk arrays or other secondary storage devices. For a discussion of illustrative continuous media file servers, see Roger L. Haskin, "The Shark Continuous-Media File Server," Proc. IEEE COMPCON '93, pp. 12–15, San Francisco, Calif. (February 1993); Fouad A. Tobagi & Joseph Pang, "StarWorks™—A Video Applications Server," Proc. IEEE COMPCON '93, pp. 4–11, San Francisco, Calif. (February 1993). In a preferred embodiment, file server 40 can be embodied as a plurality of distributed file servers which may be positioned at a plurality of remote locations throughout network 20.

In a preferred embodiment, each multimedia object stored in the multimedia system 10 is indexed by a content profiler 75 that acquires bibliographic information on each multimedia object for storage in a profile database 105, as discussed further below.

Figure 2:
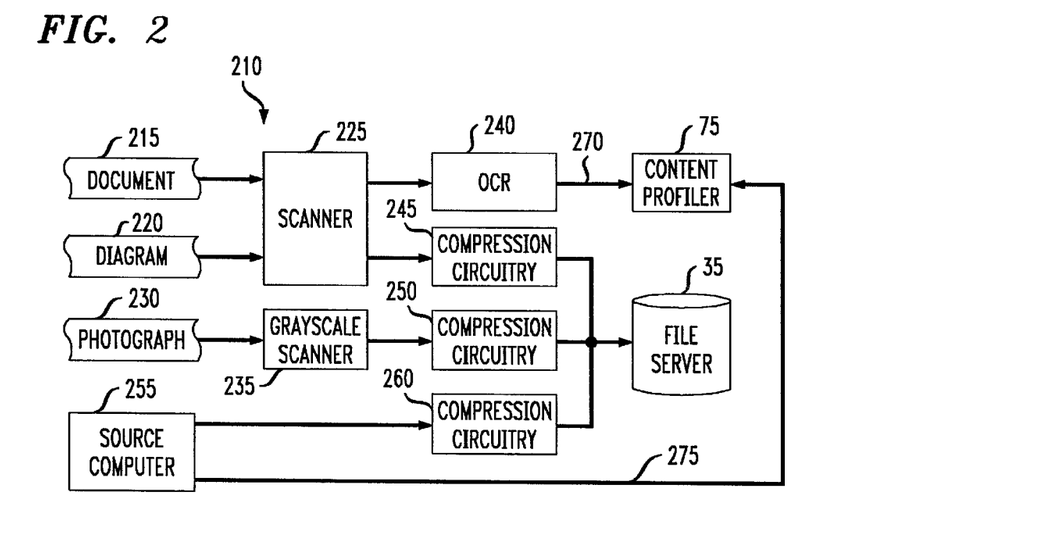
FIG. 2 is a schematic block diagram illustrating a still image information capture subsystem.
Figure 3:
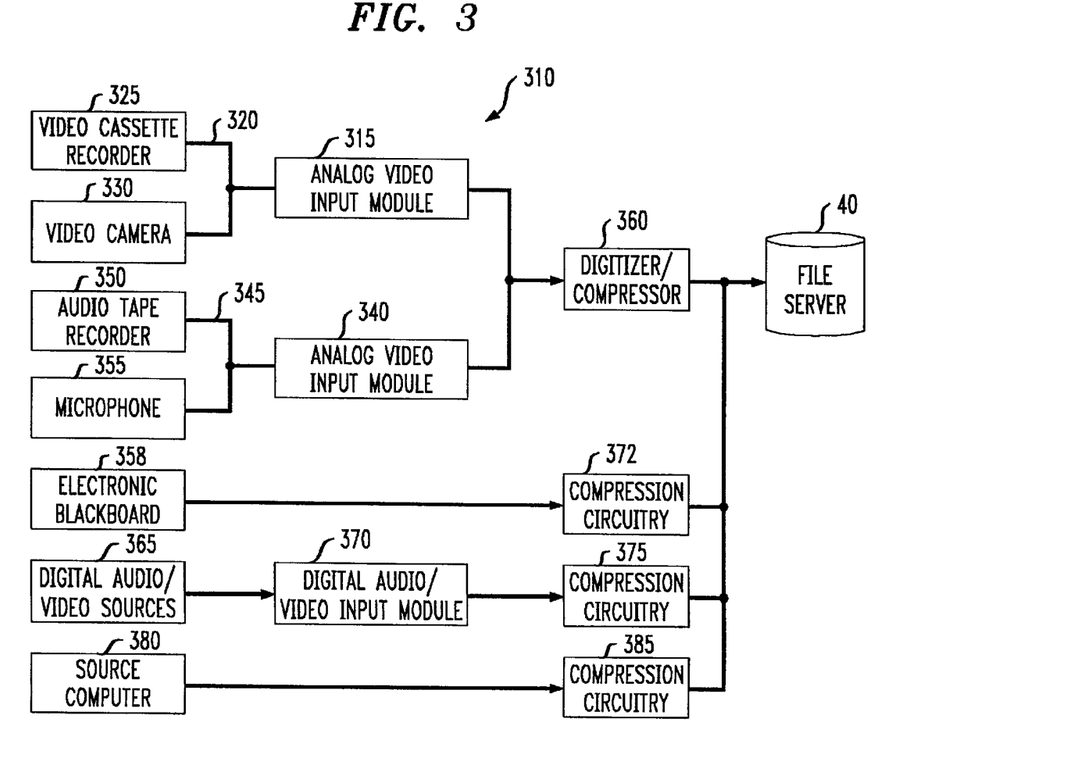
FIG. 3 is a schematic block diagram illustrating a continuous media information capture subsystem.

As illustrated in FIGS. 2 and 3, multimedia objects are stored by the networked multimedia system 10 by capture processes that obtain an electronic representation of each multimedia object. Multimedia information that is received in an electronic format, such as a document received directly from a computing system in electronic form, may be entered directly in the system 10. Multimedia information that is received in a non-electronic format, however, such as information received on paper or film, must first be converted into an electronic format using imaging technology.

An illustrative still image information capture subsystem 210 for use by the still image storage and retrieval system 60 is shown in FIG. 2. The still image information capture subsystem 210 will convert a printed document 215 or diagram 220 into an electronic format using a document scanner 225, which will convert a printed page 215, 220 into an electronic format by making a bitmap image of the page. Similarly, a photograph 230 can preferably be converted into an electronic format for entry into the system 10 using a grayscale scanner 235.

The electronic format images produced by scanner 225 and grayscale scanner 235 preferably conform to the well-known Tag Image File Format (TIFF) specification. The scanned images are preferably compressed by compression circuitry 245, 250, respectively, prior to storage by file server 35.

Multimedia information that is received in an electronic form, such as documents that are received directly from a source computer 255 in electronic form, can be stored directly by file server 35 following compression by compression circuitry 260.

The textual portions of a document 215 or a diagram 220 are preferably converted into a computer-readable format by an optical character recognition system 240 for transfer to the content profiler 75 via data link 270. Similarly, a copy of each document received directly from a source computer 255 in electronic computer-readable form is also preferably transferred to the content profiler 75, via data link 275. As discussed further below, the computer-readable form of a multimedia object may be utilized by the content profiler 75 for the automatic generation of an object profile, which may consist of an abstract and other bibliographic information.

An illustrative continuous media information capture subsystem 310 for use by the continuous media storage and retrieval system 70 is shown in FIG. 3.

An analog video input module 315 is preferably configured to receive analog video signals via data link 320 from, e.g., a video cassette recorder 325 and/or a video camera 330, as shown in FIG. 3. Similarly, an analog audio input module 340 is preferably configured to receive analog audio signals via data link 345, from, e.g., an audio tape recorder 350 and/or a microphone 355. Video camera 330 and microphone 355 may be positioned during a presentation, such as a meeting or seminar, to capture the visual and audio portions of the presentation, respectively.

In this manner, analog video and audio signals generated during a presentation by camera 330 and/or microphone 355, respectively, may be received by input modules 315, 340 for storage in the multimedia system 10.

Preferably, the analog video and audio signals received by input modules 315, 340 are processed by a digitizer/compressor 360, prior to storage by the file server 40. The digitizer/compressor 360 may be embodied as a Parallax XVideo System, consisting of a board having a JPEG CODEC chip and associated software, commercially available from Parallax Graphics, Inc. of Santa Clara, Calif. The digitizer/compressor 360 will receive analog video and audio inputs from input modules 315, 340. The digitizer/compressor 360 will preferably digitize and compress the received video input and digitize the received audio input.

The data stream generated by the digitizer/compressor 360 is preferably in the JPEG Movie File format, which is described in "JPEG Movie File Specification, Release 1.0," Parallax Graphics, Inc., Santa Clara, Calif. (Nov. 5, 1992), incorporated herein by reference. The JPEG Movie File format interleaves one frames' worth of audio with a frame of video. For example, if video signals are being stored for a display rate of 10 frames per second (fps), the resulting interleaved data file will include a repeating pattern of one frame of video, followed by a tenth of a second's worth of audio.

The JPEG Movie File format is preferred because of the inherent synchronization of the audio and video streams that results from the paired storage of a video frame with its associated audio, as discussed further below. In addition, since the JPEG technique compresses each video frame independently, there is a resulting frame independence that allows a video frame to be easily dropped in the event of network congestion, as discussed below. Other video compression schemes may be utilized, such as the MPEG compression standard. However, the MPEG compression technique, which takes into account the similarity between successive images, is less preferred because the resulting frame dependence makes it more difficult to drop video frames in the event of network congestion.

It is noted that typical workstations, such as the Sun workstations discussed above, include audio hardware 23 for receiving analog audio inputs and storing the audio signals in a digitized format. Thus, where analog audio signals are being processed, without any associated video, a workstation, such as a Sun workstation, can receive the analog audio signal via its audio input port, and then digitize the audio signal for storage as a multimedia object by a file server, such as the file server 40.

An electronic blackboard 358 is preferably provided, so that annotations made by a speaker on the blackboard 358 during a presentation may be electronically captured for storage in the multimedia information system 10. The digital signals generated by the electronic blackboard 358 can be stored directly by file server 40 in an electronic file following compression by compression circuitry 372.

A digital audio/video input module 370 is preferably configured to receive digital signals from a plurality of digital audio or video sources, such as a source 365, which may be a digital videodisk player. The digital signals received by input module 370 can be stored directly by file server 40 following compression by compression circuitry 375.

Other continuous multimedia information that is received in an electronic form directly from a source computer 380, such as animated graphics, can be stored by file server 40 following compression by compression circuitry 385.

Once the multimedia information has been stored in an electronic format by the information capture subsystems 210, 310 in the manner described above, the resulting multimedia object may be selected by a user and then transmitted over the network 20 to a workstation 15. A workstation, such as the workstation 15, will receive the transmitted multimedia object for presentation to the user.

Figure 4:
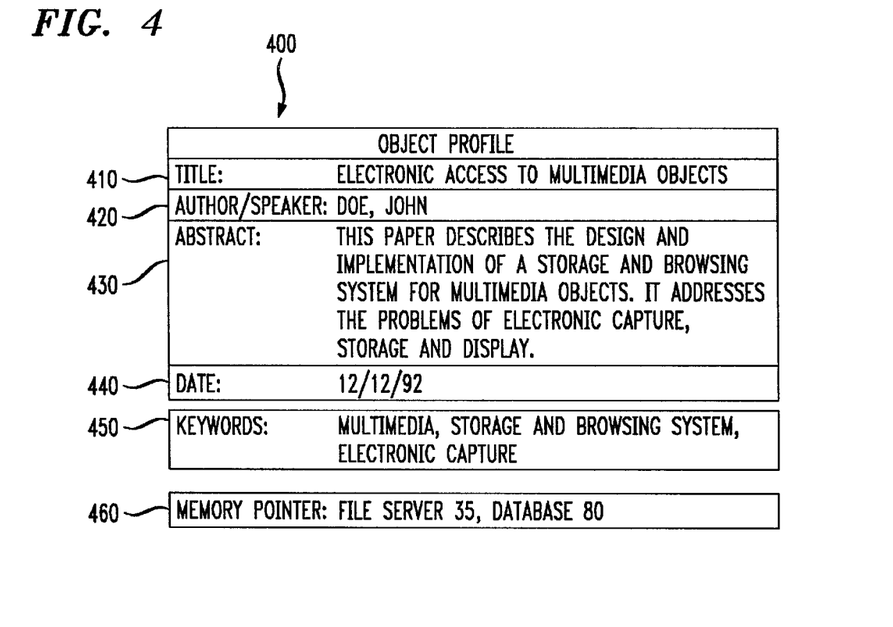
FIG. 4 illustrates an object profile that maintains bibliographic information for a multimedia object stored in the networked multimedia system of FIG. 1.

In a preferred embodiment, the content profiler 75 will create an object profile 400, shown illustratively in FIG. 4, for each multimedia object. Each object profile 400 includes bibliographic information that may be used for indexing and searching each multimedia object. In a preferred embodiment, each object profile 400 is stored centrally in a profile database 105 associated with the content profiler 75, as shown in FIG. 1.

The object profile 400 can include a plurality of entries for listing bibliographic information that describes relevant aspects of each multimedia object, such as a title entry 410, an author or speaker entry 420, an abstract entry 430, a date entry 440 and a keyword entry 450 for listing the keywords associated with the multimedia object.

In addition, each object profile 400 preferably includes an entry 460 containing a pointer to the memory location where the multimedia object is stored, i.e., an indication of the particular file server, such as file server 35 or 40, which controls the storage of the multimedia object. In one embodiment of the invention, discussed further below, entry 460 can be a multi-valued entry containing pointers to a number of related multimedia objects and/or data files.

As indicated above, the content profiler 75 can automatically generate object profiles, such as the object profile 400, for those multimedia objects that are stored in a computer-readable form. The content profiler 75 will receive multimedia objects in a computer-readable form via data link 270 from the optical character recognition system 240 and via data link 275 from source computer 255, as illustrated in FIG. 2. The object profiles associated with multimedia objects that are not stored in a computer-readable form, however, such as the object profiles for photographs, audio and video, can be generated manually for entry in the content profiler 75.

The information retrieval system 50 allows a user to access the multimedia information that has been stored in the plurality of databases, such as databases 80, 85, 90, 95, 100, associated with file servers 35, 40. As discussed above, each multimedia object has an associated object profile, such as the object profile 400, that is stored in a profile database 105. The information retrieval system 50 preferably provides a mechanism for searching the plurality of object profiles stored in the profile database 105 to identify those multimedia objects that satisfy a user-specified query.

A user may employ a workstation, such as the workstation 15, to enter a query specifying parameters for retrieving multimedia objects from the multimedia system 10. The information retrieval system 50 will retrieve all the object profiles from the profile database 105 that correspond to multimedia objects that satisfy the user-specified query. Thereafter, the information retrieval system 50 will transmit the object profiles satisfying the entered query to the workstation 15. The user can review those object profiles that satisfy the entered query and select those multimedia objects that should be downloaded to the workstation 15.

Once a multimedia object has been selected by a user, the information retrieval system 50 will access the entry 460 in the object profile that indicates the memory locations where the selected multimedia objects are stored. The information retrieval system 50 will send a retrieval message over network 20 to the respective storage and retrieval system 60, 70 which accesses the appropriate file server 35, 40 indicated by the retrieved pointer. The compressed file containing the requested multimedia object is transmitted from the respective file server to the workstation 15, in a known manner.

If the retrieved multimedia object is a still image object with many pages, such as a document, the workstation 15 will thereafter decompress each page of the multimedia object as requested for display by the user, in a known manner.

If, however, the retrieved multimedia object is comprised of continuous media, such as audio or video, the entire multimedia object will not normally be retrieved at once, due to the memory limitations associated with many workstations. Rather, the workstation 15 will utilize a prefetch routine to retrieve several frames worth of audio and video from the respective file server for storage in an audio buffer 110 and a video buffer 115, respectively, as described further below. Accordingly, the received video frames will be decompressed by the workstation 15 as they are received over the network 20 from the respective file server, in a known manner.

For a multimedia object that contains a plurality of media, such as the audio and video portions of a recorded presentation, the workstation 15 will preferably have a mechanism for synchronizing the presentation of the various outputs. In the preferred embodiment discussed above, a multimedia object containing the audio and video portions of a recorded presentation will be stored as a data file containing interleaved audio and video information in the JPEG Movie File format.

Figure 5:
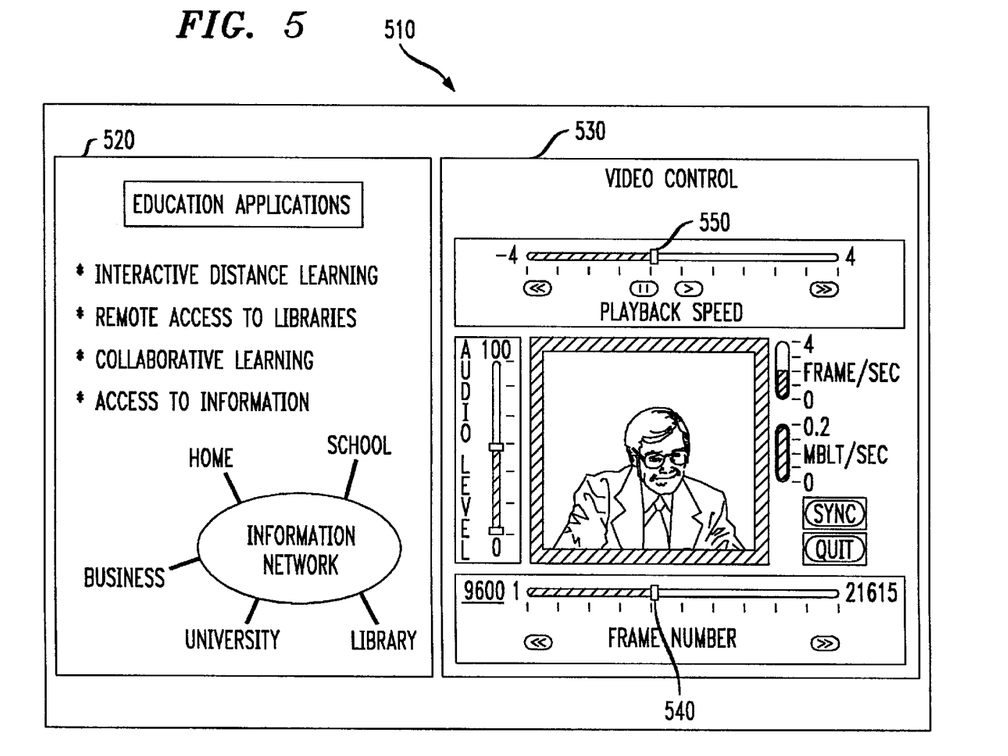
FIG. 5 illustrates a workstation display having two windows for simultaneous display of a recorded presentation, together with its associated supplemental materials.

The workstation 15 can process the interleaved JPEG data file, having a frame of video paired with its associated audio, and direct the audio information, in real time, to the audio hardware 23 of the workstation 15, in a known manner, while the video information is decompressed utilizing a software routine for presentation on display 510, in a known manner.

Alternatively, the multimedia system 10 can implement known synchronization algorithms to control the recording and playback of continuous media. During playback, the synchronization algorithm monitors the internal clock of the workstation, such as workstation 15, to determine which audio and video frames should be played and makes adjustments, if necessary.

According to one aspect of the invention, the above networked multimedia system 10 is utilized to record and store multimedia presentations, such as seminars, meetings or conferences, together with any supplemental materials that may be referenced during the presentation, such as viewgraphs, slides, handouts or blackboard annotations. The recorded presentation, together with the stored supplemental materials, may thereafter be accessed over network 20 for presentation to a user on a workstation, such as the workstation 15.

The audio and video portions of the presentation are preferably captured and converted into a multimedia object using the continuous media information capture subsystem 310, in the manner described above relative to FIG. 3. The supplemental materials that consist of still images, i.e., viewgraphs, slides and handouts, are preferably separately processed from the recorded presentation and stored as a separate multimedia object by the still image information capture subsystem 210, in the manner described above relative to FIG. 2.

In addition, according to a further feature of the invention discussed further below, the supplemental materials that consist of continuous media, i.e., the annotations made by a speaker on an electronic blackboard 358, are preferably stored as a separate multimedia object by the continuous media information capture subsystem 310, in the manner described above relative to FIG. 3.

In a preferred embodiment, illustrated in FIG. 5, the recorded presentation, together with the stored supplemental materials, may be simultaneously presented on a display, such as display 510 of workstation 15, containing two separate viewing windows 520, 530. In this manner, the appropriate supplemental materials may be displayed in window 520 as they are referenced during the recorded presentation being displayed in window 530.

Preferably, the presentation of the audio and video components of the recorded presentation is synchronized with the presentation of the supplemental materials in window 520. As discussed further below, the supplemental materials are an additional medium to be synchronized with the presentation of the audio and video portions of the recorded presentation.

As is known, a video presentation consists of a large number of sequential video frames which may be recorded at a fixed rate, such as a frame rate of 10 frames per second. Thus, the video frame number can be utilized as an index into the video stream. In addition, as discussed further below, the supplemental materials that are associated with the recorded presentation, such as the viewgraphs, may be identified with the video frames in which they are referenced.

SYNCHRONIZATION OF THE RECORDED PRESENTATION AND STILL IMAGE SUPPLEMENTAL MATERIALS

Where the supplemental materials associated with the recorded presentation is comprised of a multi-page still image object, such as viewgraphs and handouts, each page of the still image multimedia object may be numbered sequentially in the order in which it is referenced during the recorded presentation. The recorded presentation and the associated still image supplemental materials may thereafter be synchronized by means of a still image hyperlink file, such as the still image hyperlink file 600 illustrated in FIG. 6.

Figure 6:
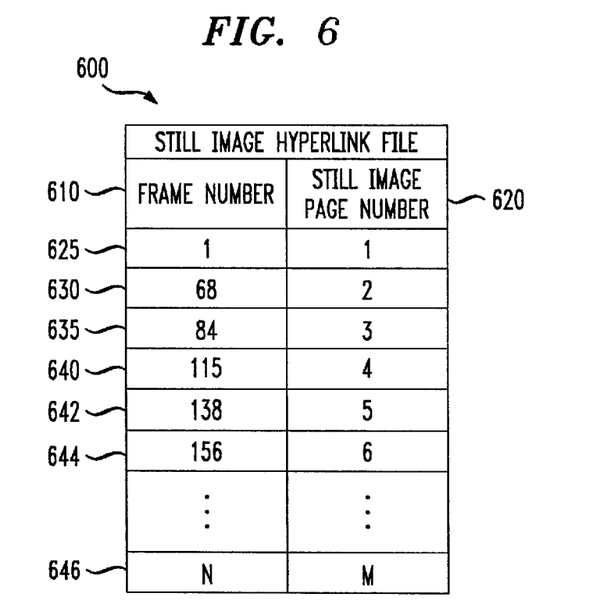
FIG. 6 illustrates a still image hyperlink file that maintains the starting video frame number associated with each page of the still image supplemental materials.

The still image hyperlink file 600 preferably consists of a plurality of video frame-still image page pairs, i.e., the page number of the still image multimedia object in column 620 together with the corresponding frame number in column 610 in which the still image page is first referenced.

The still image hyperlink file 600 will include a plurality of rows, such as rows 625, 630, 635, 640, 642, 644, 646, each corresponding to a video frame-still image page pair. Each time a page of the still image supplemental material object, such as a viewgraph, is referenced during the presentation, an entry is made in column 620 of the still image hyperlink file 600 with the appropriate page number of the supplemental material, together with the number in column 610 of the video frame in which the supplemental material page is first referenced. If the same viewgraph, or other still image supplemental material, is referenced more than once during a recorded presentation, it is preferably assigned a unique page number for each appearance of the still image page.

According to a feature of the invention, a pair of independent processes, which may interact by means of a message passing mechanism, are preferably utilized to display a recorded presentation and its associated still image supplemental materials. A video process controls the presentation of the audio and video portions of the recorded presentation. The video process preferably incorporates the features and functions of the presentation processes of the Continuous Media Player, described in the reference incorporated above, as well as the additional features and functions described below.

Where the recorded presentation has associated still image supplemental materials, the video process will interact with a still image presentation process in order to present the appropriate still image supplemental materials in the window 520 of display 510. The still image presentation process preferably incorporates the features and functions of the still image presentation processes of the Ferret Document Browser, described in the reference incorporated above, as well as the additional features and functions described below.

Figure 7:
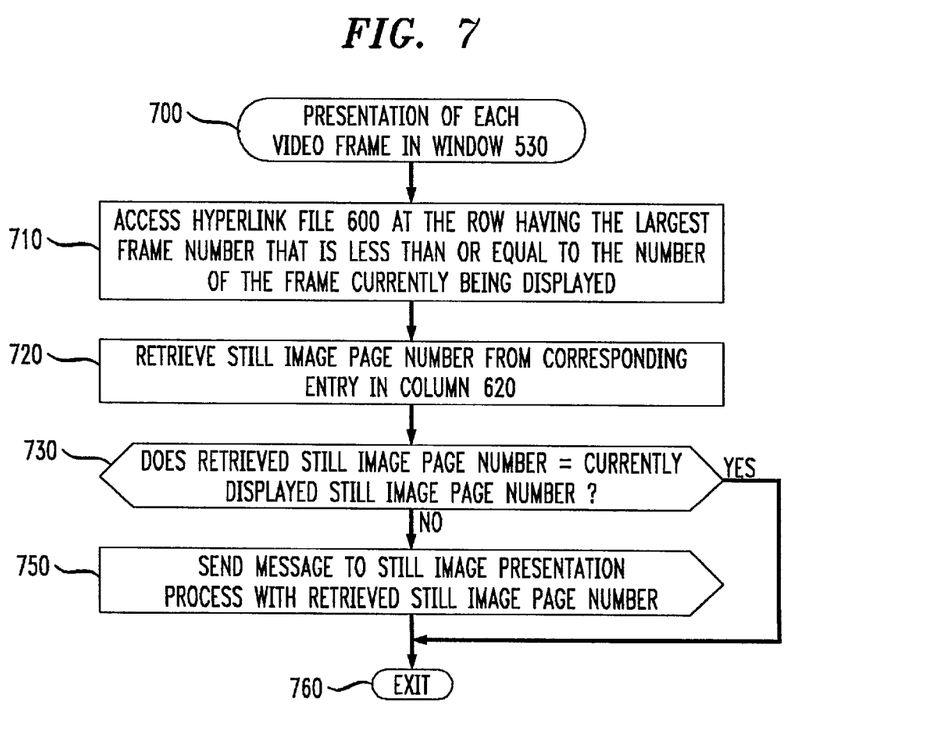
FIG. 7 illustrates a flow chart describing an exemplary still image synchronization subroutine according to the present invention as utilized by a known video process to synchronize the display of the recorded presentation with its still image supplemental materials on the workstation display of FIG. 5.

The video process preferably utilizes a still image synchronization subroutine, illustrated in FIG. 7, to synchronize the still image supplemental materials in window 520 with the ongoing video presentation in window 530. If the recorded presentation has associated still image supplemental materials, the video process will enter the still image synchronization subroutine at step 700 as each video frame is presented in window 530, as shown in FIG. 7.

During step 710, the still image synchronization subroutine will access the still image hyperlink file 600 to determine if the appropriate page of the still image file is being displayed in window 520. The still image synchronization subroutine will access the row of the still image hyperlink file 600 having the largest video frame number that is less than or equal to the frame number currently being displayed.

Once the appropriate row of the still image hyperlink file 600 is accessed, the still image synchronization subroutine will retrieve, during step 720, the appropriate still image page number from the corresponding entry in column 620. The still image synchronization subroutine will compare during step 730 the still image page number retrieved from the still image hyperlink file 600 in the previous step to the page number of the still image currently displayed. If it is determined during step 730 that the retrieved still image page number does equal the currently displayed still image page number, the appropriate still image is being displayed, and the still image synchronization subroutine will be exited at step 760. Process control will thereafter return to the video process.

If, however, it is determined during step 730 that the retrieved still image page number does not equal the currently displayed still image page number, the synchronization subroutine will send a message to the still image presentation process during step 750, which includes an indication of the still image page number which should be displayed in window 520, as retrieved during step 720. The still image synchronization subroutine will thereafter be exited during step 760 and process control will return to the video process.

When the still image presentation process receives the still image page number from the still image synchronization subroutine, transmitted during step 750, the still image presentation process will decompress the appropriate page of the supplemental materials multimedia object corresponding to the received still image page number for presentation in window 520, in a known manner.

SYNCHRONIZATION OF THE RECORDED PRESENTATION AND CONTINUOUS MEDIA SUPPLEMENTAL MATERIALS

According to a further feature of the invention, the supplemental materials associated with a recorded presentation may consist of continuous media, such as the annotations made by a speaker on an electronic blackboard 358 during the associated presentation. Preferably, the electronic file that stores the blackboard annotations or other continuous media supplemental materials associated with a recorded presentation is marked with a time stamp or other counter which may serve as an index into the recorded blackboard annotations. In this manner, recorded blackboard events, i.e., the placement of strokes on the electronic blackboard 358, can be presented with the video frames in which the blackboard event is referenced.

Figure 8:
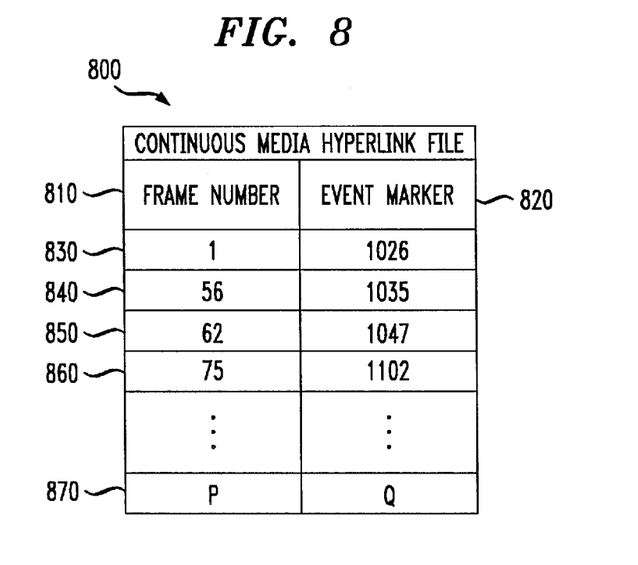
FIG. 8 illustrates a continuous media hyperlink file that maintains an event marker and the associated starting video frame number for each blackboard event, or stroke, that is placed on an electronic blackboard.

The recorded presentation and associated continuous media supplemental materials are preferably synchronized by means of a continuous media hyperlink file, such as the continuous media hyperlink file 800 illustrated in FIG. 8. The continuous media hyperlink file 800 preferably consists of a plurality of video. frame-event marker pairs, i.e., a marker that identifies the position of the recorded blackboard event within the associated electronic file in column 820 together with the corresponding frame number in column 810 in which the corresponding blackboard event is first referenced.

The continuous media hyperlink file 800 will include a plurality of rows, such as rows 830, 840, 850, 860, 870, each corresponding to a video frame-event marker pair. For each blackboard event, or stroke, that is placed on the electronic blackboard 358 during the presentation, an entry is preferably made in column 820 of the continuous media hyperlink file 800 with the event marker that identifies the position of the recorded blackboard event within the associated supplemental material electronic file. In addition, the video frame number in which the blackboard event is first referenced is placed in column 810.

When the recorded presentation has associated continuous media supplemental materials, the video process, discussed above, will preferably interact with a continuous media presentation process in order to coordinate the presentation of the appropriate continuous media supplemental materials in the window 520 of display 510. The continuous media presentation process preferably incorporates the features and functions of the presentation processes of the Continuous Media Player, in a manner similar to the video process, as well as the additional features and functions described below.

Figure 9:
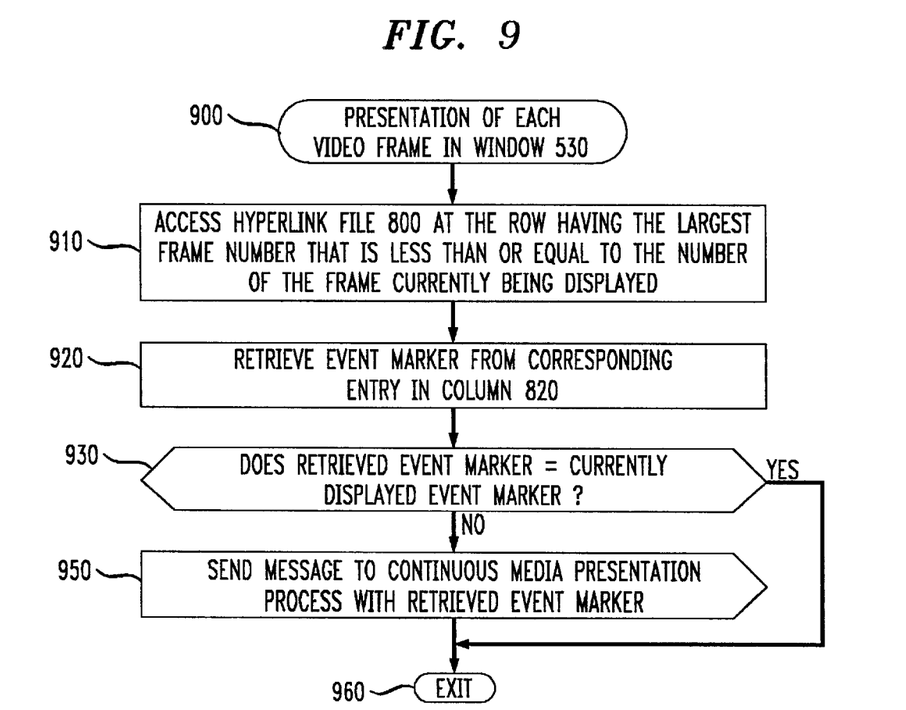
FIG. 9 illustrates a flow chart describing an exemplary continuous media synchronization subroutine according to the present invention as utilized by a known video process to synchronize the display of the recorded presentation with its continuous media supplemental materials on the workstation display,of FIG. 5.

The video process preferably utilizes a continuous media synchronization subroutine, illustrated in FIG. 9, to synchronize the continuous media supplemental materials in window 520 with the ongoing video presentation in window 530. If the recorded presentation has associated continuous media supplemental materials, the video process will enter the continuous media synchronization subroutine at step 900 as each video frame is presented in window 530, as shown in FIG. 9.

During step 910, the continuous media synchronization subroutine will access the continuous media hyperlink file 800 to determine if the appropriate segment of the electronic file, i.e., the appropriate blackboard event, is being presented in window 520. The continuous media synchronization subroutine will access the row of the continuous media hyperlink file 800 having the largest video frame number that is less than or equal to the frame number currently being displayed.

Once the appropriate row of the continuous media hyperlink file 800 is accessed, the continuous media synchronization subroutine will retrieve, during step 920, the appropriate event marker from the corresponding entry in column 820. During step 930, the continuous media synchronization subroutine will compare the event marker retrieved from the continuous media hyperlink file 800 during step 920 to the event marker associated with the blackboard event currently being displayed.

If it is determined during step 930 that the retrieved event marker equals the event marker associated with the blackboard event currently being displayed, the appropriate blackboard event is being displayed, and the continuous media synchronization subroutine will be exited at step 960. Process control will thereafter return to the video process.

If, however, it is determined during step 930 that the retrieved event marker does not equal the event marker associated with the blackboard event currently being displayed, the continuous media synchronization subroutine will send a message to the continuous media presentation process during step 950, which includes the event marker as an indication of the file position from which the associated electronic file that contains the recorded blackboard annotations should be restarted. The continuous media synchronization subroutine will thereafter be exited during step 960 and process control will return to the video process.

When the continuous media presentation process receives the event marker from the continuous media synchronization subroutine, transmitted during step 950, the continuous media presentation process will make an adjustment to the presentation of the continuous media supplemental materials in window 520 by restarting the presentation from the position in the electronic file indicated by the received event marker, in a known manner.

When a recorded presentation has associated still image and/or continuous media supplemental materials, a single object profile, similar to the object profile 400 illustrated in FIG. 4, is preferably utilized to profile the multimedia objects corresponding to the recorded presentation and associated supplemental materials. The entry 460 of object profile 400 is preferably a multi-valued entry containing a plurality of pointers, e.g., a pointer to the multimedia object corresponding to the recorded presentation, a pointer to the multimedia object corresponding to the supplemental materials and, where appropriate, a pointer to the hyperlink file 600 associated with the recorded presentation.

Thus, when a user selects a recorded presentation having associated supplemental materials, in the manner described above, the information retrieval system 50 will access the entry 460 to retrieve the plurality of pointers. Thereafter, the information retrieval system 50 will send a retrieval message over network 20 to each file server indicated by the plurality of retrieved pointers. The data files containing the recorded presentation, corresponding supplemental materials, and, where appropriate, the respective hyperlink file 600, 800, will be transmitted by the respective file servers to the workstation, such as workstation 15.

Window 530 of display 510 includes a frame number scroll bar 540 that allows a user to scroll through video frames. Once the user has selected a starting frame using the frame number scroll bar 540, the video process will restart the video, together with the corresponding audio, from the selected video frame. If the recorded presentation has associated still image supplemental materials, the video process will utilize the still image synchronization subroutine of FIG. 7 to retrieve the appropriate still image page number from the still image hyperlink file 600 corresponding to the selected starting video frame, for transmittal to the still image presentation process.

Similarly, if the recorded presentation has associated continuous media supplemental materials, the video process will utilize the continuous media synchronization subroutine of FIG. 9 to retrieve the appropriate event marker from the continuous media hyperlink file 800 corresponding to the starting video frame selected using the frame number scroll bar 540, for transmittal to the continuous media presentation process.

It is noted that if a user has selected a frame number that has not yet been received by the workstation 15 from the respective file server, the video process must first transmit a retrieval request to the file server to retrieve the necessary frames.

In addition, window 530 includes a playback speed scroll bar 550 that allows a user to control the playback speed, in frames per second, of the recorded presentation, in a known manner. The playback speed scroll bar allows the user to adjust the playback speed from a minimum of zero frames per second, i.e., a still image, up to the maximum recorded frame rate of the video, in either forward or reverse mode.

Once the user has selected a video playback speed using the playback speed scroll bar 550, the video process will adjust the rate of data being requested from the storage and retrieval system 70 to the selected playback speed, in addition to making local adjustments to the video and audio outputs of workstation 15.

It is noted that where the recorded presentation has associated still image supplemental materials the video process will utilize the still image synchronization subroutine of FIG. 7 to retrieve the appropriate still image page number from the still image hyperlink file 600 in the same manner for both forward and reverse playback of the video, as described above. Similarly, where the recorded presentation has associated continuous media supplemental materials, the video process will utilize the continuous media synchronization subroutine of FIG. 9 to retrieve the appropriate event marker from the continuous media hyperlink file 800 in the same manner for both forward and reverse playback of the video, as described above.

In a preferred embodiment, a user can manipulate the still image or continuous media supplemental materials in window 520 to control the video playback in window 530. In this manner, the presentation of the supplemental materials can serve as an index to the recorded presentation. A user can proceed through the supplemental materials in window 520, e.g., by clicking the left button of a mouse in window 520 to move through the supplemental materials in a forward direction or clicking the right button of the mouse to move in a reverse direction.

Once the user has selected a desired still image page or continuous media event in window 520, the recorded presentation in window 530 can be restarted from the video frame where the still image page or continuous media event is referenced in the recorded presentation. Upon selection of a desired page or event in window 520, the still image presentation process or the continuous media presentation process, as appropriate, preferably sends a message to the video process with the selected still image page number or continuous media event marker. The video process will thereafter access the respective hyperlink file 600, 800 to retrieve the video frame that corresponds to the selected still image page or continuous media event. The video process will then restart the video from the retrieved frame number.

It is noted that where the supplemental materials associated with a recorded presentation consist of a combination of still images and continuous media, a third viewing window (not shown) may be provided on display 510 for the simultaneous presentation of the recorded presentation, together with the stored still image supplemental materials and continuous media supplemental materials. Alternatively, window 520 may be configured to alternately present still images or continuous media, as they are referenced during the recorded presentation, in a known manner.

NETWORK CONGESTION

In order to compensate for congestion on network 20 that causes the delayed arrival of audio and video data, the video process will preferably prefetch audio and video frames from the respective file server 40 for storage in audio and video buffers 110, 115, respectively, on the user's workstation to minimize the effect of network congestion on the playback of the recorded presentation. Since two-way video conferencing applications demand rapid response times, the buffering of audio and video data would not normally be tolerated in such applications. It is noted, however, that during the playback of recorded presentations the buffering of audio and video data would not be detected by a user.

According to one feature of the invention, the networked multimedia system compensates for congestion on network 20 using an adaptive control algorithm to dynamically vary the rate at which video frames are retrieved from the respective file server 40 over network 20, in response to increases or decreases in the amount of other data being transmitted across the network 20. For a discussion of an illustrative adaptive control algorithm, see section 2.3 of the Continuous Media Player reference, incorporated above.

In order to maximize the playback quality of the recorded presentation, the audio component of the recorded presentation is preferably given preference over the video component. It has been found that a person viewing a recorded presentation will object more strongly to defects in the audio portion of the recorded presentation than to defects in the video portions of the presentation.

Figure 10:
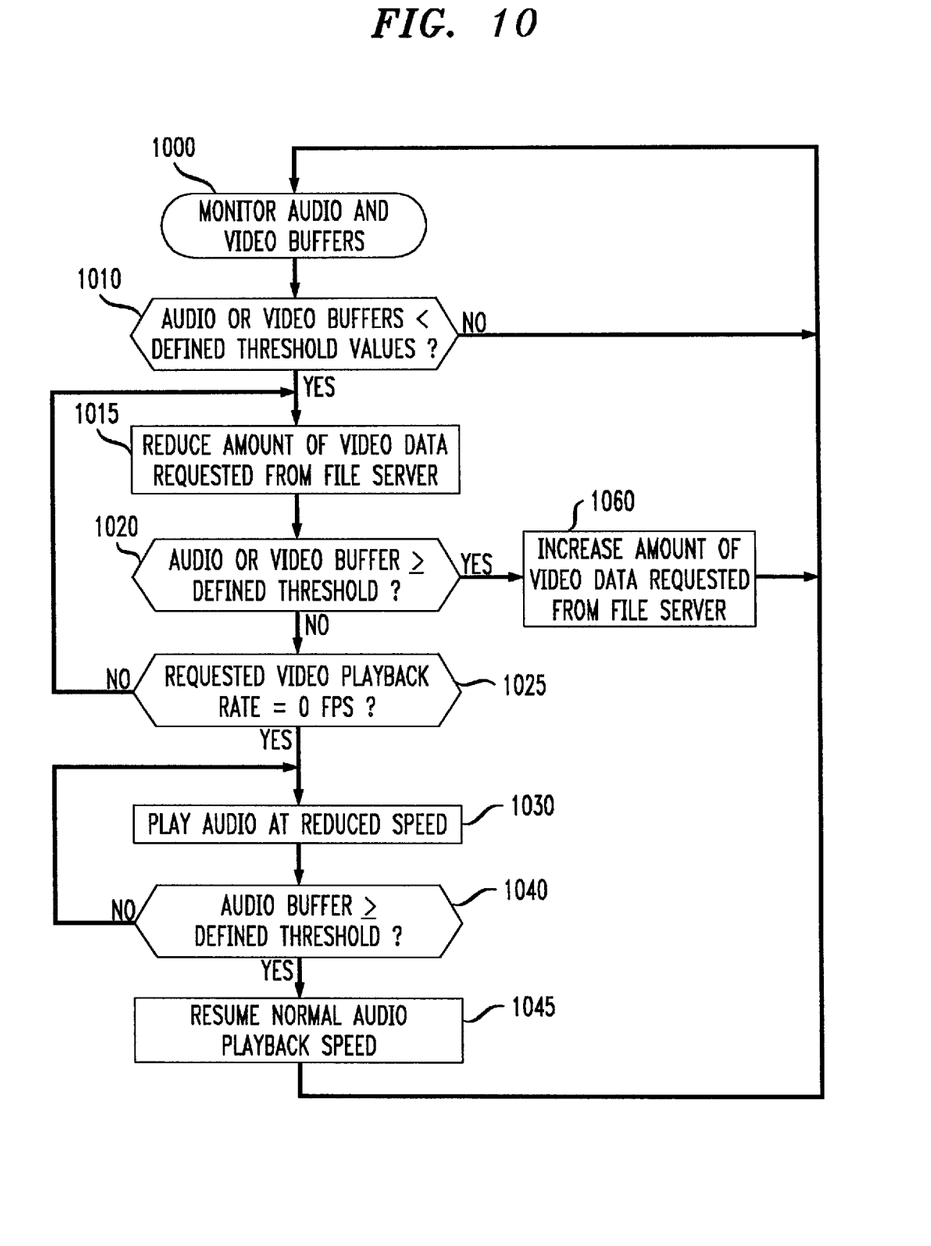
FIG. 10 illustrates a flow chart describing an exemplary data buffer monitoring subroutine according to the present invention as utilized to maintain a pre-defined amount of data in audio and video buffers.

In a preferred embodiment, the video process utilizes a data buffer monitoring subroutine, illustrated in FIG. 10, to maintain a pre-defined amount of audio and video data in the audio and video buffers 110, 115. The data buffer monitoring subroutine will continuously monitor the audio and video buffers 110, 115 during step 1000, until the amount of audio or video data stored in the audio or video buffers 110, 115 drops below a predefined threshold value, as detected by step 1010.

If it is determined during step 1010 that the amount of audio or video data in the audio or video buffers 110, 115, respectively, has fallen below the desired threshold value, the data is not arriving at the workstation 15 from the respective file server 40 over network 20 as fast as it is being presented to a user by the workstation 15. Thus, the data buffer monitoring subroutine will reduce the requested video playback rate during step 1015 by requesting that the file server 40 transmit fewer video frames per second to the workstation 15. It is noted, however, that the data buffer monitoring subroutine will preferably continue to request all of the audio data from the file server 40.

After the requested video playback rate is reduced during step 1015, a test is performed during step 1020 to determine if the amount of audio or video data in the audio or video buffers 110, 115 is still below the desired threshold value. If it is determined during step 1020 that the amount of audio or video data in the audio or video buffers 110, 115 has risen above the desired threshold value, program control will proceed to step 1060, discussed below.

If, however, it is determined during step 1020 that the amount of audio or video data in the audio or video buffers 110, 115 is still below the desired threshold value, a test is performed during step 1025 to determine if the requested video playback rate has been reduced to the minimum value, i.e., a playback rate of 0 frames per second (fps).

If it is determined during step 1025 that the requested video playback rate has not yet been reduced to the minimum value, program control will return to step 1015 for a further reduction in the requested video playback rate.

If it is determined during step 1025 that the requested video playback rate has been reduced to the minimum value, network congestion conditions are so extreme that even though no video data is being transmitted across the network 20, the audio data is still not arriving fast enough over the network 20 to maintain the desired size of the audio buffer 110. In a preferred embodiment, the data buffer monitoring subroutine will compensate for the delayed arrival of audio data by playing the audio data from the audio buffer 110 at slower than real-time.

Thus, the data buffer monitoring subroutine will begin playing the audio at a reduced speed during step 1030. The data buffer monitoring subroutine will continue playing the audio at the reduced speed until it is determined during step 1040 that the amount of audio data in the buffer has returned to the desired threshold value. Once it is determined during step 1040 that the amount of audio data in the buffer is greater than or equal to the desired threshold value, the data buffer monitoring subroutine will resume playing the audio at a normal, or real-time, speed during step 1045. Thereafter, program control will return to step 1000, and continue in the manner described above.

The data buffer monitoring subroutine could play the audio at half-speed during step 1030, e.g., by dividing each frames' worth of buffered audio data into n segments and then playing each segment twice. If it is desired to play the audio at a speed between half speed and normal speed, not all of the n segments are played twice. Similarly, if it is desired to play the audio at a speed less than half speed, some of the n segments may be played more than twice.

In a preferred embodiment, the data buffer monitoring subroutine will gradually adjust the playback speeds of the audio during steps 1030 and 1045 in order to make the transition from one speed to another less noticeable to a listener. For example, the data buffer monitoring subroutine can reduce the audio playback rate during step 1030 according to a scale that gradually adjusts the playback rate between a defined maximum and minimum audio playback rate. In addition, by monitoring the rate at which the audio buffer 110 is emptying, the data buffer monitoring subroutine can determine how quickly the audio playback rate should be reduced during step 1030 and what the minimum audio playback rate should ultimately be.

In an alternate embodiment, the data buffer monitoring subroutine could play the audio at a reduced speed during step 1030 by utilizing a well-known pitch extraction process, which identifies where the pauses are in the audio and makes the pauses longer.

Once the data buffer monitoring subroutine has stabilized the amount of data in the audio and video buffers 110, 115, as detected during step 1020, program control will proceed to step 1060. During step 1060, the amount of video data requested from the respective file server will be gradually increased. Thereafter, program control will return to step 1000 to continue monitoring the audio and video buffers 110, 115 in the manner described above.

Although the data buffer monitoring subroutine will drop video frames during times of network congestion, it is preferred that the video process will access the still image synchronization subroutine of FIG. 7 where the supplemental materials consist of still images or the continuous media synchronization subroutine of FIG. 9 where the supplemental materials consist of continuous media for each video frame, regardless of whether or not the video frame is actually displayed in window 530. In this manner, synchronization is maintained between the presentation of the supplemental materials in window 520 and the continuing audio presentation, even in the absence of video frames.

It is to be understood that the embodiments and variations shown and described herein are illustrative of the principles of this invention only and that various modifications may be implemented by those skilled in the art without departing from the scope and spirit of the invention.

We claim:

1. A method for use by a computing system receiving audio and video data over a network for presentation to a user, said method compensating for congestion on said network which causes delayed arrival of said audio and video data, said video data being transmitted over said network to said computing system at a requested video transmittal rate, said audio data being presented to said user at an audio playback rate, said network congestion compensation method comprising the steps of:

- maintaining an audio buffer for storing a predefined amount of said audio data received over said network;
- maintaining a video buffer for storing a predefined amount of said video data received over said network;
- monitoring said audio and video buffers to determine when said amount of audio or video data in said buffer falls below said predefined amounts;
- reducing said requested video transmittal rate if said monitoring step determines that said amount of audio or video data in said buffers has fallen below said predefined amounts; and
- reducing said audio playback rate if said amount of audio data in said audio buffer is below said predefined amount of audio data after said step of reducing said requested video transmittal rate.

2. The network congestion compensation method according to claim 1, further including the step of increasing said audio playback rate once said amount of audio data in said audio buffer is above said predefined amount of audio data.

3. The network congestion compensation method according to claim 1, wherein said step of reducing said audio playback rate is not performed unless said step of reducing said requested video transmittal rate has reduced said requested video transmittal rate to a minimum value.

4. The network congestion compensation method according to claim 1, wherein said step of reducing said audio playback rate plays said audio at a reduced speed by dividing said audio data in said audio buffer into a plurality of segments and playing one or more of said segments at least twice.

5. The network congestion compensation method according to claim 1, wherein said step of reducing said audio playback rate plays said audio at a reduced speed by utilizing a pitch extraction process.

6. The network congestion compensation method according to claim 1, wherein said step of reducing said audio playback rate will gradually adjust said audio playback rate to make the transition from one speed to another less noticeable to said user.

7. A computer-readable storage medium comprising encoded computer-readable program instructions for use in conjunction with a programmable computer receiving audio and video data over a network for presentation to a user, which instructions cause the computer to compensate for congestion on the network that results in delayed arrival of the audio and video data, the video data being transmitted over the network at a requested video transmittal rate to a video buffer for storing a predefined amount of the video data and the audio data being presented to the user at an audio playback rate, wherein a predefined amount of the audio data is stored in an audio buffer, the program instructions defining steps to be performed by the programmable computer, the steps comprising:

- monitoring the audio and video buffers to determine when the amount of audio or video data in the buffers falls below the predefined amounts;
- reducing the requested video transmittal rate if the monitoring step determines that the amount of audio or video data in the buffers has fallen below the predefined amounts; and
- reducing the audio playback rate if the amount of audio data in the audio buffer is below the predefined amount of audio data after the step of reducing the requested video transmittal rate.

8. The computer-readable storage medium of claim 7, wherein the steps further comprise increasing the audio playback rate once the amount of audio data in the audio buffer is above the predefined amount of audio data.

9. The computer-readable storage medium of claim 7, wherein the step of reducing the audio playback rate is not performed unless the step of reducing the requested video transmittal rate has reduced the requested video transmittal rate to a minimum value.

10. The computer-readable storage medium of claim 7, wherein the step of reducing the audio playback rate plays the audio at a reduced speed by dividing the audio data in the audio buffer into a plurality of segments and playing one or more of the segments at least twice.

11. The computer-readable storage medium of claim 7, wherein the step of reducing the audio playback rate plays the audio at a reduced speed by utilizing a pitch extraction process.

12. The computer-readable storage medium of claim 7, wherein the step of reducing the audio playback rate will gradually adjust the audio playback rate to make the transition from one speed to another less noticeable to the user.

* * * * *